United States Patent Office 3,519,359
Patented July 7, 1970

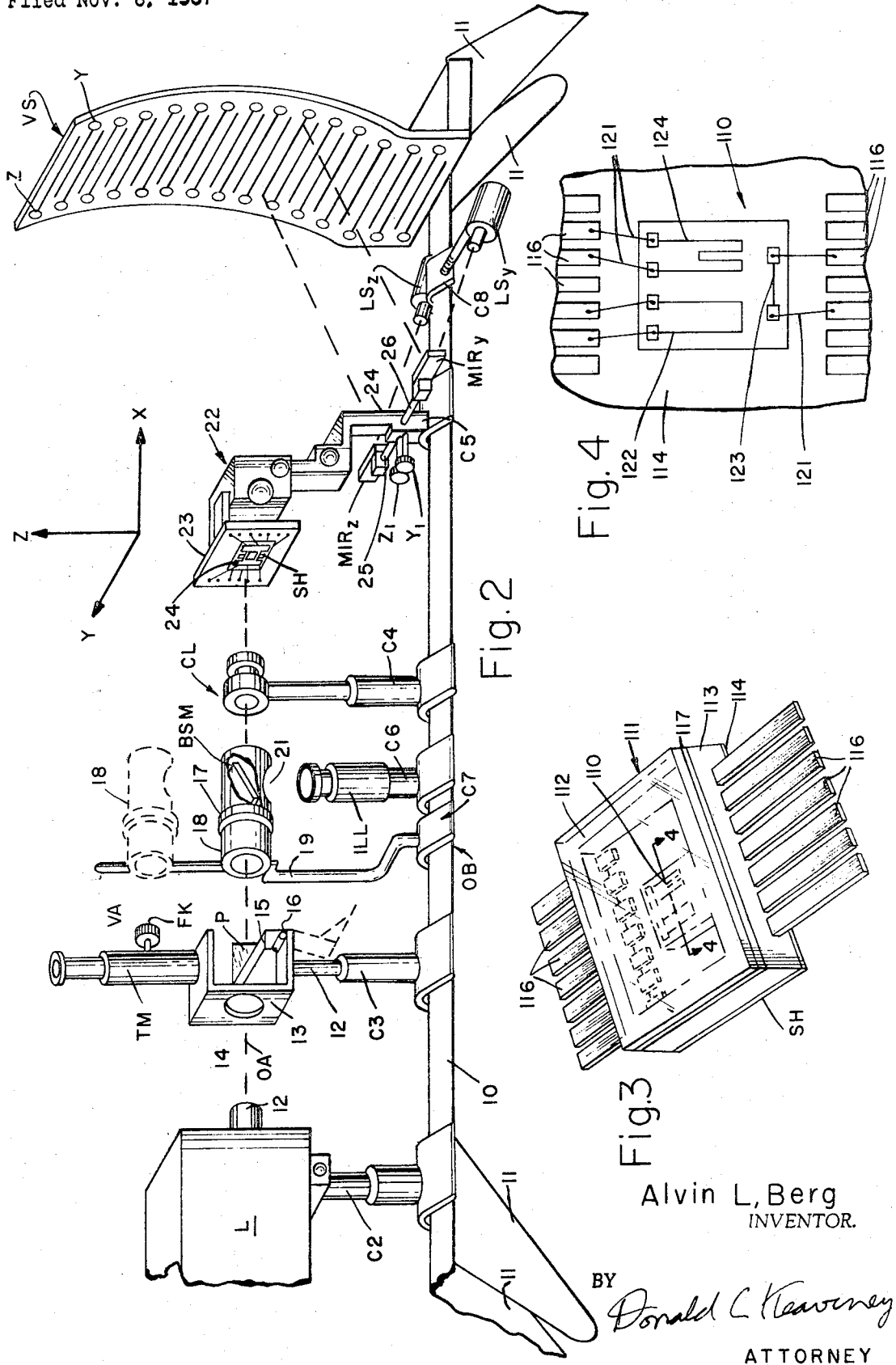

3,519,359
LASER MOVABLE TARGET POSITIONING
APPARATUS
Alvin L. Berg, Thousand Oaks, Calif., assignor to TRW
Inc., Redondo Beach Calif., a corporation of Ohio
Filed Nov. 6, 1967, Ser. No. 680,700
Int. Cl. G01b 11/26
U.S. Cl. 356—172          4 Claims

ABSTRACT OF THE DISCLOSURE

This invention relates to apparatus for movably positioning a target onto various selectable portions of which it is desired to impinge a focused laser beam. The apparatus finds use, for example, in trimming thin film cermet resistors formed in microelectronic circuits and devices where it is desired to move the laser beam along a thin film strip resistor in order to adjust the resistance value thereof. Similarly, the apparatus is useful in any application where it is desired to controllably micromanipulate a target with respect to a fixed position focused laser beam. The optical path from the fixed position laser source to the movably supported target has positioned therein a prism mounted on a solid opaque hinged plate in such a fashion that when the plate mounted prism is in the viewing position in the optical path, a light image from the target is diverted out of the optical path and into the viewing axis of a telemicroscope, the opaque plate serving to preclude any accidental transmission of laser light into the telemicroscope. Next, along the optical path from the laser to the movable target is a retractably mounted beam splitting mirror and means to illuminate it. Finally, a condensing lens is positioned between the mirror and the target. The target is supported by a compound manipulator. In the first or viewing position of the prism, light from the illuminator is transmitted by the beam splitting mirror to the target and is reflected back through the prism into the viewing axis of the telemicroscope so that the operator may align any desired portion of the target with a reticule determined point. In the second or operative position of the hinged prism, the opaque plate mounting the prism is moved out of the optical path so that light from the laser source is transmitted along the optical path to impinge the target at the point previously selected by viewing through the reticule. Of course, the apparatus is first calibrated by burning a point on a sample target with the laser and then adjusting the telemicroscope. Thereafter, the telemicroscope and the laser are left in fixed position with respect to each other and only the target is moved. The supporting means for the target is provided with an optical galvanometer comprising mirrors mounted to the control knobs of the compound manipulator, a light source aimed at the mirrors, and a graduated indexed scale positioned to receive the light reflected from the source by the mirror. The arrangement is such that motion of the knob moves the mirror and hence the image of the light source along the scale in such a fashion as to provide a magnified measure of the extent of motion of the control knob so as that a precise measure of this motion is achieved. In operation, after the apparatus is calibrated, one first views the object such as a strip resistor to be irradiated and positions it with respect to the reticule noting the point on the scale at which it begins. The target support is then moved to the end of the resistor and another notation is made of the point on the scale at which the resistor ends. Next, the prism is moved out of the viewing position and into the operative position, the laser is turned on, and the motion previously determined to be necessary is again executed in either the reverse or forward direction along the scale.

CROSS-REFERENCE TO RELATED APPLICATION

This invention discloses apparatus suitable for carrying out the process disclosed and claimed in application Ser. No. 638,361 filed on May 15, 1967 by James L. Buie entitled, "Semiconductor Product and Process of Manufacture Thereof" and assigned to the same assignee as is the present application.

BACKGROUND OF THE INVENTION

This invention is in the field of precise and controlled focusing of laser beams over an adjustable and selectable pattern. Apparatus is commercially available for using lasers for microwelding and similar operations. As has been more fully set forth in the above-noted application Ser. No. 638,361, such apparatus has previously been used to focus a laser beam to adjust resistance values by annealing thin film strip resistors in microcircuit devices. In both the welding and resistor trimming applications, such laser powered optical apparatus has posed several problems. The laser beam used can be extremely damaging to the eye of the operator if unintended exposure occurs. It is thus essential that an adequate safety precaution be provided to preclude this. Such a safety precaution must be provided consistently with the factors of economy, ease and precision of adjustment and use of the apparatus, and flexibility, range and precision of target movement.

It is an object of this invention to provide a movable target positioning apparatus for a laser beam which overcomes the above-noted problems of the prior art.

It is a further object of this invention to provide such apparatus utilizing a hingedly mounted prism having an opaque supporting plate to preclude accidental exposure of the eye of the operator to laser radiation.

It is a still further object of this invention to provide such apparatus having an optical galvanometer arrangement to precisely measure the motion of the target relative to a fixed laser beam.

SUMMARY OF THE INVENTION

These and other related objects and advantages of the invention are achieved in a manner which will become apparent from the detailed description below. Briefly, however, they are achieved, as noted above, by providing an optical bench arrangement wherein the optical path from a fixed laser to a movably mounted target has positioned therein a prism mounted on an opaque hinged plate in such a fashion that in a first viewing position, the prism reflects a light image from the target into viewing axis of a telemicroscope for alignment with a reticule therein. In a second position, the prism is moved out of the optical path so that light from the laser is transmitted to the target through a condensing lens to the point established by the reticule. The arrangement is described in greater detail below in connection with the drawing.

BRIEF DESCRIPTION OF THE DRAWING

FIG. 2 is an isometric view of an embodiment of the apparatus of FIG. 1.

FIG. 3 is an isometric view of a typical microelectronic device target drawn to an enlarged scale.

FIG. 4 is a plan view of a portion of the device of FIG. 3 showing resistors to be trimmed and is taken on the line 4—4 of FIG. 3.

DESCRIPTION OF THE PREFERRED EMBODIMENT

Figure 1A:
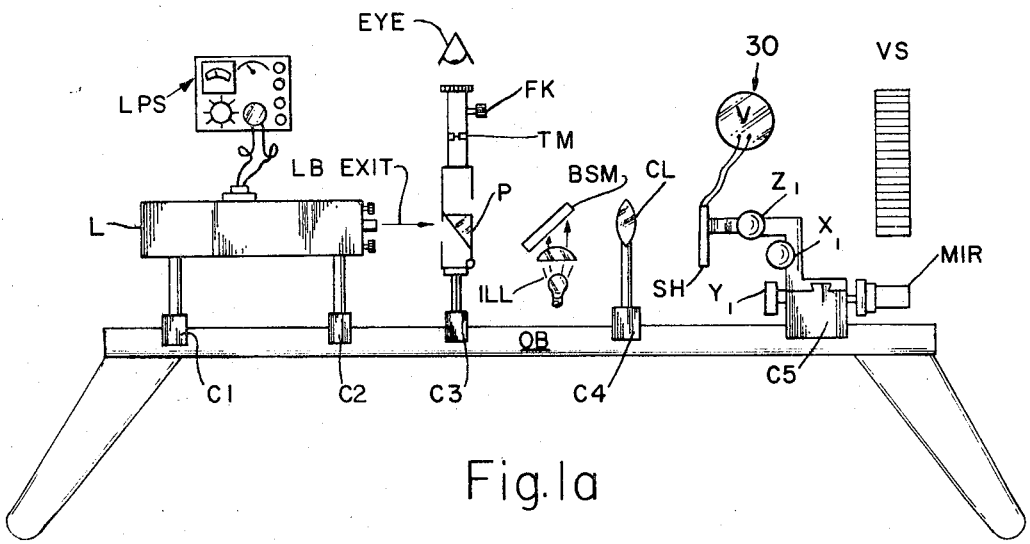
FIG. 1a is a diagrammatic view schematically illustrating the apparatus of the present invention.
Figure 1B:
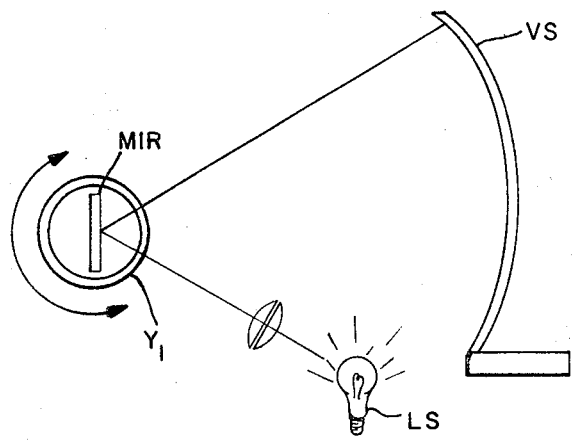
FIG. 1b is a diagrammatic view of the optical galvanometer.

Turning now to the drawings, there is shown in FIGS. 1a and 1b, a diagrammatic view of the apparatus of the present invention. A laser beam LB is generated by any suitable laser source L having an appropriate power supply LPS which is provided with the usual controls for the laser. The laser and much of the remaining apparatus is mounted on adjustable carriers, C1 and C2, to an optical bench OB. The laser L and the method of mounting it are shown in greater detail in FIG. 2. On the emergent beam side of the laser is a prism P which is mounted on an opaque plate which in turn is hinged to a floor plate of the telemicroscope TM. The support for the telemicroscope and hinged prism arrangement is also provided by the optical bench via a carrier C3. The telemicroscope is provided with a focus knob FK which provides conventional motion to bring the eyepiece into focus for the eye of the observer. The telemicroscope is also provided with any conventional reticule arrangement for sighting a particular point along the optical axis.

A condensing lens CL is also mounted to the optical bench by a carrier C4, located between the prism P and the condensing lens CL is a beam-splitting mirror BSM which is illuminated by an illuminator ILL integrally mounted onto a retractable support not shown in FIG. 1. Shown holding the substrate SH is a compound manipulator which itself is attached to the optical bench by a carrier C5. The compound manipulator is provided with an X axis control knob X1, a Y axis control knob Y1, and a Z axis control knob Z1. From the substrate holder emerges at least two electrical connectors to a bridge circuit, not shown, and including a meter 30, such as voltmeter as illustrated. Plane mirrors, MIR, are attached to the X and Y positioning shafts or control knobs by any suitable means such as small magnets.

As can be seen more clearly in FIG. 1b, a projected slit image from light source LS reflects from these mirrors onto a viewing scale VS to establish shaft position reference points for the control knob. It will be apparent that at any given position, the slit image of the light source LS is focused by the projection lens onto the mirror, MIR, and is in turn reflected from it onto the viewing scale VS. The usual reflection law, of course, applies so that the angle of reflection is equal to the angle of incidence. Hence, if the control knob is moved through any given angle $\theta$, the point on the viewing scale will be moved through an angle $2\theta$, which is twice as great as the angle of motion of the control knob. It is thus possible to get a very accurate reading of the angle of rotation of the control knob. In practice, of course, such an optical galvanometer arrangement is provided for the control knob of each of the two axes in which it is desired to move the substrate as will be more apparent from the discussion below. Actually, the viewing scales may either be placed separately, or may comprise the two edges of a single viewing scale arrangement, if the angle of projection is correctly arranged.

The X axis is taken to be the axis along the optical bench support and is therefore parallel to the optical axis of projection of the laser beam LB. The Y axis, as is conventional notation, is considered to be in the horizontal plane of the optical bench and perpendicular to the X axis, whereas the Z axis is taken as the vertical axis and is thus parallel to the viewing avis of the telemicroscope. It may, for convenience of positioning, be desired to move the substrate along the X axis, but there is no need for measuring the control knob motions producing this motion, since it does not contribute to relative positioning of the laser beam and the substrate. It is the motions of the control knobs for the Y and Z axes which it is desired to measure and display by means of the optical galvanometer arrangement.

In operation, the apparatus is first calibrated by positioning any convenient target in the compound manipulator and turning on the laser to burn a spot on the target surface so as to define the optical path along which the laser beam is travelling. During this calibration step, or whenever the laser beam is turned on, the prism P is swung on its hinge down out of the optical path and the illuminated beam splitter is also moved out of the optical path to permit free passage of the laser beam through the condensing lens onto the substrate. After the calibrating spot has been made to provide a record of the location of the optical axis, the prism and beam splitting mirror are moved back into the optical path and the telemicroscope is focused on the substrate so that its reticule defining the viewing axis of the telemicroscope is positioned on the image of the spot burned by the laser beam. Thereafter, the relative position of the condensing lens, the telemicroscope and laser having been thus adjusted, they are left in fixed relationship to each other and only the substrate is moved by the compound manipulator.

Once the apparatus has been thus calibarted, the resistor trimming operation consists of two phases. First, the actual substrate on which a resistor to be trimmed exists is positioned onto the manipulator and the resistor pattern thereof is aligned with the crosshairs of the telemicroscope. During this operation, of course, the optical prism means is in its first or calibrating position in wthich it deflects any possible light from the laser (should it be accidentally turned on) out of the optical path by virtue of being mounted on an opaque backing plate. However, light from the illuminator is reflected first by the half silvered beam splitting mirror so that it passes through the condensing lens onto the target held by the manipulator and is reflected back along the optical axis into the prism which reflects it as a 90° angle up the viewing axis of the telemicroscope so that the target can be moved to bring it into alignment with the reticule at its desired point. It has previously been established that this adjustment also defines the point on which the laser beam will impinge when it is turned on. The observer is able to view the image of the substrate with light provided by the illuminator and move it to bring the desired point into alignment with the reticule of the telemicroscope. This he does by manipulating the Y and Z inputs of the compound manipulator to align the resistor with the crosshairs or other reticule arrangement. After the alignment of the substrate, the projected slits from the mirrors on the Y and Z axis control knobs are focused onto the respective viewer scales VS and referenced with respect to the starting of a resistor bar as viewed through the eyepiece. The viewer scale reference stops are noted initially and the Y and Z axes control knobs are turned through the angle necessary to bring the reticule defined point to the opposite end of the given resistor bar. Again, the final viewer scale positioned is read and noted. The reading of the optical galvanometer has thus provided two sets of coordinates defining the beginning and end of the resistor so that the substrate can be moved through the necessary locus without the viewer having his eye to the telemicroscope and without the prism being in the optical axis.

The second or operative phase of the operation is initiated by rotating the prism P clockwise or down in the drawing so as to allow the laser beam LB to pass through the telemicroscope housing unobstructed. The mirror BSM is retracted out of the laser beam path and the laser L is turned on either from the power supply or a remote control knob. The laser beam then emerges from the exit side of the laser and is focused by the condensing lens onto the resistor as previously seen in the eyepiece. By turning the appropriate Y and Z axis control knob, the beam can be made to traverse the resistor beween arbitrarily determined viewer stops, thereby exposing the resistor to the laser beam along the locus defined by these stops and hence causing the resistance of the resistor to change. The change in resistance can simultaneously be read by noting the meter reading 30 of an electrical bridge circuit connected in circuit with the actual resistor being trimmed. The resistor trimming can, of course, be initiated from either end of the resistor. That is to say, it can be initiated from the second reading taken in the first phase or by first going back and starting over again from the first reading. The transverse of the resistor surface is continued between viewer stops until the meter reading coincides with a predetermined or desired value of resistance. The second or operative phase is thus completed, the laser is turned off and the optical prism means is moved out of its retracted operative position back into the first or calibrating position. The operator is now ready to dismount the substrate which has been trimmed, to position a new substrate on the manipulator and to again carry out the above-described sequence of steps.

The instrument thus permits an operator to position and reference a substrate very accurately within the field of view of the telemicroscope after having aligned the laser beam and the viewing optics to be axially coincident. It also permits the operator to anneal or heat treat the resistors at or below their threshold of resistance change to improve stability and temperature coefficient of resistance or to anneal or heat treat resistors at or above their threshold of resistance change to change resistor values. Depending upon the type of resistance material and its percentage composition, the laser heating can be used to raise or lower resistance values. The instrument also permits the operator to sharply focus the laser beam on an accurately predetermined spot and evaporate a part of the resistor thereby raising the value of the resistor if the need exists. The sharpness of focusing, of course, is purely a functioning of the laser control system and the condensing lens. By incorporating the galvanometer mirrors with control knob rotation and referencing to the viewer scale, extreme precision of adjustment is possible in either the Y or Z directions. The instrument also permits localized heating for selected areas of thin film or other target materials. The instrument can thus be used to improve electrical contacts in microcircuits in a manner equivalent to the sintering procedure used to make ohmic contact between aluminum and silicon. Of course more generally, the instrument can be used to focus a laser beam or any target material and permit the movable positioning of the target through a known and predetermined pattern of locus with respect to the measurable and predictable point of impact or optical axis of the laser beam. Thus, by moving the target through precisely controlled motions with respect to a fixed position laser beam and providing auxiliary optics to define these target motions, it has been found possible to achieve a much higher degree of control, safety, and ease of operation than has heretofore been achieved.

It will, of course, be understood that many product designs could be evolved incorporating the optical arrangement illustrated in principle in FIGS. 1a and 1b. A laboratory prototype of such apparatus is shown in greater detail by way of example in FIG. 2.

In FIG. 2, the optical bench OB comprises a generally triangular shaped rod 10 extending in the X axis direction and supported at both ends by feet or extensions 11. A conventional laser L is mounted by a carrier C2 to the bar 10. The carrier C2 is adjustable in position by set screws or any other conventional means. The laser L has an output port lens system indicated generally at 12. The laser used is any suitable conventional device of a power range and output suitable for the particular application. The output from lens system 12 is directed along the optical axis OA of the system. This optical axis is generally parallel to the bar 10 and lies in the direction which we have defined as the X axis. The viewing axis VA of the telemicroscope TM, on the other hand, lies along the Z axis and intersects the optical axis OA orthogonally to define the ZX plane. The viewing axis is, of course, the axis of the telemicroscope and passes through the reticule thereof.

The telemicroscopic TM is mounted to the bar 10 of the optical bench by a movable carrier C3. Protruding upwardly from carrier C3 is a vertical shaft 12 supporting a housing 13 to the top of which the objective lens and barrel or primary body of the telemicroscope TM is mounted. In the housing 13 there is an aperture 14 which lies in the optical axis of the system so as to permit the output of the laser to pass through the aperture. The prism P is mounted on an opaque plate or supporting member 15 which is hinged by hinge member 16 to the front of the bottom surface of the generally U shape housing 13. The prism P is shown in solid line in its first or calibrating position. In this postion, the opaque plate 15 precludes the possibility of any light from the laser L being reflected up into the eye of the viewer through the telemicroscope since it rests against the back of the housing 13 in such a manner as to block the aperture 14, thereby preventing the transmission of the laser beam even if the laser is accidentally turned on. The prism P is supported by the plate 15 in such position that it lies at the intersection of the viewing axis VA and the optical axis OA of the system. Hence, in the position shown in solid line, the operator viewing through the telemicroscope is in effect looking along the optical axis of the system from the prism, since the image transmitted back from the substrate SH is reflected up into the telemicroscope by the well-known mirror action of the prism P. In the dashed line position, the prism P has been swung on its hinged plate 15 down out of the optical axis so that light from the laser beam can be transmitted along the optical axis. In this position, however, it will be noted that there is no transmission of any light up through the telemicroscope from the optical axis of the system. That is, there is no prism or mirror surface reflecting light either from the laser or from the substrate along the Z direction in which the viewing axis of the telemicroscope lies. Of course, it will be understood that not only is the carrier C3 adjustable along the rod 10, but also the telemicroscope itself is adjustable by conventional means along the Z azis and is provided with the usual focusing arrangement.

Adjacent to the telemicroscope is a carrier C7 also attached to the bar 10 of the optical bench. On the carrier C7 there is mounted by a ring clamp 17 a tubular housing 18 in which the beam splitting mirror BSM is mounted at an angle of 45° to the optical axis. The housing 18 is movable up and down the supporting rod 19 which is attached to carrier C7 so that it too can be moved in and out of the optical axis path. In the drawing, the solid line position shows the beam splitting mirror in the optical axis cooperating with the prism to facilitate the first or calibrating phase of the operation. The dotted line position of the housing 18 shows the beam splitting mirror moved up out of the optical path so as to permit free transmission of the laser beam. Although the beam splitting mirror and the prism are shown as separate elements without any mechanical connections other than common support, it will be obvious that a linkage could readily be provided in a commercial type of apparatus so that movement of a handle to one of two positions would, through linkages, move both the prism and the housing 18 into or out of the optical axis. In the position of these elements shown in solid line in FIG. 2, such a linkage arrangement would preferably also lock the switch of the laser power supply in an off position.

The illuminator ILL is supported on carrier C6 attached to the optical bench in such fashion that the light output from its objective lens 20 is directed upwardly through an aperture 21 in the housing 18 onto the beam splitting mirror BSM.

Adjacent to the illuminator, a carrier C4 attached to the optical bench supports the usual housing for a condensing lens indicated generally at CL. This condensing lens focuses the output of the laser onto the target substrate SH in the operative position and also serves to form an image of this target in the calibrating position.

The carrier C5 supports on the optical bench the compound manipulator indicated generally by the reference character 22. This manipulator may be of any conventional type commercially available wherein a series of gears and rack and pinion movement devices supports a plate member 23 for accurately controlled movement. The substrate SH is supported on plate 23 by any convenient attaching means such as screws, clamps or the like and is provided with a plurality of electrical output terminals 24 which in operation provide output leads for attachment to the meter M shown in FIG. 1 but not included in FIG. 2. It will, of course, be understood that the meter or bridge circuit can be any separately available conventional resistance measuring means. The manipulater 22 is provided with a first knob Y1 and a second knob Z1 attached to the ends of shafts protruding from a housing 24 integral with the carrier C5. The rotation of control knob Y1 actuates a gear train which causes the substrate supporting plate 23 to move to the left or right along the Y axis in accordance with the direction in which the knob is turned. Rather than attaching the mirrors directly to these control knobs as suggested in FIG. 1, the apparatus shown in FIG. 2 is such that the shaft from the knob actuates bevel gears which in turn actuates shafts 25 and 26 protruding out of the housing 24 on the left and right sides thereof, respectively. The mirror $MIR_Y$ is attached to a shaft which is actuated by the bevel gear moved in turn by the $Y_1$ knob, whereas the mirror $MIR_Z$ is attached to the shaft which is moved by the motion of the Z knob. The purpose of this arrangement is to permit a single viewing scale VS to be used to record the motions in the two directions. Thus, the light sources $LS_Z$, $LS_Y$ are attached to a carrier C8 and have the slit and projection lens integral with them. The output from these light sources is directed as indicated by the dashed lines onto the respective mirrors and from the mirrors is reflected onto the associated scales of the viewer VS.

The substrate SH is shown to a greatly enlarged scale and in much greater detail in FIGS. 3 and 4, FIG. 4 being a sectional view taken on the line 4—4 of FIG. 3. The arrangement shown here is one wherein a wafer of silicon 110 having resistors 122, 123, and 124 deposited thereon is enclosed in a flat pack arrangement 111 which is provided with a Kovar housing 113 to which a glass or other transparent cover 112 has been attached as taught in the above-noted copending application. Protruding through the walls of the Kovar housing are electrical conductors 116 which are to be connected to the terminals 24 shown in FIG. 2. The plan view of FIG. 4 illustrates a typical arrangement of a test resistor pattern which may be a thin film strip of cermet resistive material deposited on the silicon wafer 110. The exact value of this resistance can be trimmed or adjusted by the instrument disclosed herein when operated as described above by moving the wafer 110 in such a fashion that the focussed beam of the laser traverses the resistor until it has achieved the desired resistance value as measured by the meter.

While a convenient optical bench arrangement of essential parts in their desired optical relationship has been illustrated in detail, it will be apparent that many other supporting arrangements, housings, viewing angles and the like could be devised while yet retaining the essential features set forth above.

What is claimed is:

1. Laser movable target positioning apparatus comprising:
    (a) means to movably support a target;
    (b) means to transmit and focus a laser beam along a predetermined path onto a portion of said target;
    (c) a telemicroscope having a point defining reticle positioned in the viewing axis thereof, said viewing axis intersecting said optical path between said laser beam and said target;
    (d) calibrating image forming means retractably positioned in said optical path;
    (e) optical means movably positioned at the intersection of said optical path and said viewing axis, said optical means having a first calibrating position in which it deflects said laser beam from said optical path and prevents said laser beam from entering the viewing axis of said telemicroscope and simultaneously diverts light reflected from said target along said optical path by said image forming means into said viewing axis, and said optical means having a second operative position and in which light from said target is not diverted into said viewing axis and in which light from said laser is transmitted along said optical path to said target; and
    (f) means to precisely indicate the variation in the position of said target resulting from movements of said target support means, whereby a preselected area of said target may be successively illuminated by said laser beam.

2. Apparatus as in claim 1 wherein said target position indicating means comprise an optical galvanometer including a mirror attached to a member which controls the motion of said means to movably support said target, a light source focused on said mirror, and a graduated scale positioned to receive the image of said light source reflected from said mirror, said light source, said mirror, and said scale being arranged geometrically so that motion of said control member produces motion of said image along said scale as a magnified measure of the extent of motion of said control member.

3. Laser movable target positioning apparatus comprising:
    (a) means to movably support a target;
    (b) means to transmit and focus a laser beam along a predetermined optical axis onto a portion of said target;
    (c) viewing means having a viewing axis intersecting said optical axis between said target and said laser beam;
    (d) calibrating image forming means retractably positioned in said optical axis;
    (e) optical means movably positioned at the intersection of said optical axis and said viewing axis, said optical means having a first calibrating position in which it deflects said laser beam from said optical axis and prevents said laser beam from entering the viewing axis and simultaneously diverts light reflected from said target along said optical axis by said image forming means into said viewing axis, and said optical means having a second operative position in which it is removed from said optical axis to permit light from said laser to be transmitted along said optical axis to said target; and
    (f) means to precisely indicate the variation in the position of said target resulting from movements of said target support means, whereby a preselected area of said target may be successively illuminated by said laser beam.

4. Apparatus for laser trimming of microcircuit elements comprising:
    (a) means to movably support a target;
    (b) means to precisely display the variation in the position of said target resulting from movements of said target support means;
    (c) a laser light source and a telemicroscope mounted in predeterminably fixed relationship to each other, said telemicroscope having a reticle coaligned to view the spot on said target on which said laser beam is focused;
    (d) calibrating means to permit the alignment of said target with said reticle before activating said laser; and (e) means to limit the level of laser radiation which can be transmitted through said telemicroscope to preclude the occurrence of dangerous radiation.

References Cited

UNITED STATES PATENTS

| | | | |
|---|---|---|---|
| 2,288,243 | 6/1942 | Hyde | 350—285 |
| 3,096,767 | 7/1963 | Gresser et al. | 331—94.5 |
| 3,265,855 | 8/1966 | Norton | 331—94.5 |
| 3,392,258 | 7/1968 | Bruma et al. | 331—94.5 |

RONALD L. WIBERT, Primary Examiner

P. K. GODWIN, Jr., Assistant Examiner

U.S. Cl. X.R.

219—229; 350—285